United States Patent
Mori (10) Patent No.: US 8,917,793 B2
(45) Date of Patent: Dec. 23, 2014

(54) COMMUNICATION CIRCUIT, COMMUNICATION NETWORK, AND CONNECTING APPARATUS

(75) Inventor: Setsuro Mori, Ritto (JP)

(73) Assignees: RIB Laboratory, Inc., Shiga Prefecture (JP); Honda Motor Co., Ltd., Tokyo (JP)

( * ) Notice: Subject to any disclaimer, the term of this patent is extended or adjusted under 35 U.S.C. 154(b) by 873 days.

(21) Appl. No.: 12/979,746

(22) Filed: Dec. 28, 2010

(65) Prior Publication Data
US 2011/0176559 A1   Jul. 21, 2011

(30) Foreign Application Priority Data

Jan. 15, 2010   (JP) .................................... 2010-6484

(51) Int. Cl.
*H04L 25/34* (2006.01)
*H04L 25/49* (2006.01)
*H04B 1/74* (2006.01)

(52) U.S. Cl.
CPC ........................................ *H04B 1/74* (2013.01)
USPC ........... 375/288; 375/212; 375/285; 375/299; 375/347; 375/349; 714/2; 714/3; 714/10; 714/11

(58) Field of Classification Search
USPC .......... 714/100, 1, 2, 3, 10, 11; 375/211–215, 375/259, 285, 286, 288, 295, 299, 316, 340, 375/346–347, 349
See application file for complete search history.

(56) References Cited

U.S. PATENT DOCUMENTS

| | | | |
|---|---|---|---|
| 2,803,703 A | | 8/1957 | Sherwin |
| 3,755,628 A | * | 8/1973 | Games et al. ................. 370/445 |
| 5,305,325 A | | 4/1994 | Roos |
| 6,213,567 B1 | | 4/2001 | Zittlau et al. |
| 2004/0199813 A1 | | 10/2004 | Hillman et al. |
| 2006/0143513 A1 | | 6/2006 | Hillman et al. |
| 2008/0141057 A1 | | 6/2008 | Hillman et al. |
| 2009/0158088 A1 | | 6/2009 | Hillman et al. |
| 2010/0220828 A1 | * | 9/2010 | Fuller et al. .................. 375/355 |

FOREIGN PATENT DOCUMENTS

| | | |
|---|---|---|
| EP | 0 466 224 | 1/1992 |
| JP | 02-202137 | 8/1990 |
| JP | 07-250050 | 9/1995 |

(Continued)

OTHER PUBLICATIONS

European Search Report dated Jun. 14, 2013 in corresponding European Patent Application No. 10015985.4.

*Primary Examiner* — Sam K Ahn
*Assistant Examiner* — James M Perez
(74) *Attorney, Agent, or Firm* — Wenderoth, Lind & Ponack, L.L.P.

(57) ABSTRACT

The present invention provides a communication circuit, a communication network, and a connecting apparatus that can realize communication with very high reliability using a simple wiring system, that includes a communication line 2 comprising three or more signal lines 2a,2b,2c, a signal distributing section 4, that is connected to one end of the communication line 2, for distributing and transmitting a signal input into an input terminal 3i to respective signal lines 2a,2b, 2c, and a majority selection receiving circuit 5, that is connected to the other end of the communication line 2, for comparing a plurality of reception signals received via the signal lines 2a,2b,2c and selecting reception signals which are most matched with one another as true so as to output them to an output terminal 30.

21 Claims, 6 Drawing Sheets

(56) References Cited

FOREIGN PATENT DOCUMENTS

| JP | 09-034809 | 2/1997 |
| JP | 3595033 | 2/1997 |
| JP | 10-338133 | 12/1998 |
| JP | 2001-147885 | 5/2001 |
| JP | 2008-283461 | 11/2008 |

* cited by examiner

COMMUNICATION CIRCUIT, COMMUNICATION NETWORK, AND CONNECTING APPARATUS

FIELD OF THE INVENTION

The present invention relates to a communication circuit, a communication network, and a connecting apparatus. More specifically, the invention relates to the communication circuit, the communication network and the connecting apparatus that enable communication with high reliability.

DESCRIPTION OF THE PRIOR ART

When communication cables are wired and signals are transmitted and received, defective communication occasionally occurs due to influence of electrical and magnetic noises and deterioration in the communication cables. Further, when signals with which defective communication occurs are used for control as it is, an operation of the entire system is inhibited.

In order to heighten the reliability of the communication using the communication tables, error detecting codes such as parity, checksum, cyclic redundancy checksum (CRC) are added to signals, and a check is made whether accurate communication is held by using the error detecting codes. It is requested that reception signals where occurrence of an error is checked are discarded, and signals where an error occurs are retransmitted. However, when signals are retransmitted, communication time of double length is required, and this causes deterioration in a response.

In recent years, like a computer system disclosed in Japanese Patent No. 3595033 (Patent Document 1), particularly when wiring for communication of important signals is provided, two communication cables are wired so that the same signals are transmitted. Its object is to doubly transmit the same signals and accurately hold communication via any one of the communication cables so as to be capable of communicating even during a failure.

In communication network standards used for LAN in automobiles (for example, FlexRAY: registered trade name of Daimler AG), the same signals are transmitted to one communication cable at a plurality of times and they are compared, so that a determination is made whether the accurate communication is held. However, when important data is transmitted twice, doubled communication time is required. Therefore, when the same signals are sent by using two communication cables, these two signals are compared so that a confirmation can be made whether the accurate communication is held. That is to say, in addition to detection of defective communication using error detecting codes, signals sent by using two communication cables are compared, so that a determination can be made more securely whether accurate communication is held. Further, communication with higher reliability can be held.

However, the double communication using two communication cables enables only the determination whether received signals are properly sent, and when an error cannot be detected by error detecting codes, a determination cannot be made which value is true. For this reason, both signals should be discarded in such a case. In order to complement the discarded signals, retransmission of signals should be demanded, and thus data communication should be again held. For this reason, lengthening of the communication time cannot be avoided. This becomes a problem particularly when immediate response to communicated signals is required, and thus a delay of control occurs.

Further, in order to compare signals once received by two communication cables, two communication circuits should be provided to a transmission side and a reception side, and CPU for comparing the received signals and determining an error is required. That is to say, a part of the processing ability of the CPU is used for determination of an error and selection in communicated signals. Therefore, in order to duplicate signals in conventional systems, special control system and program are required, and this causes complication of a constitution and a rise in manufacturing costs.

In addition, in order to realize the conventional duplication, CPU such as a microcomputer is required as a connecting destination of the communication cables. For this reason, the constitution becomes complicated from this point, and thus the duplication cannot be adopted only for fairly important communication. That is to say, it is very difficult to realize the duplication of communication cables in wiring of a control system such as a sequence circuit or a programmable logic controller (hereinafter, PLC) where a CPU is not provided to each terminal or of a control system such as an in-vehicle LAN having a CPU with low processing ability.

Particularly in control systems such as an in-vehicle control system and a mechanical control system, in recent years, wirings are saved, but in car or machine control, while noise resistance and high reliability are being maintained, simplification of the constitution and a reduction in the manufacturing cost are demanded. Further, it is desired that CPU that causes a defective operation is eliminated as much as possible in the control systems for cars and machines, but the conventional duplication cannot satisfy this demand.

The present invention is devised in view of the above matters, and its object is to provide a communication circuit, a communication network, and a connecting apparatus that can realize communication with very high reliability using a simple wiring system.

SUMMARY OF THE INVENTION

In order to solve the above problems, a first aspect provides a communication circuit characterized by including a communication line comprising three or more signal lines, a signal distributing section, that is connected to one end of the communication line, for distributing and transmitting a signal input into an input terminal to respective signal lines, and a majority selection receiving circuit, that is connected to the other end of the communication line, for comparing a plurality of reception signals received via the signal lines and selectiving reception signals which are most matched with one another as true so as to output this reception signal to an output terminal.

Since the signal input into the input terminal at one end of the communication line is distributed and transmitted to the respective signal lines by the signal distributing section, the same signals are transmitted to the other end by the signal lines. On the other end, the reception signals received via the signal lines are compared, and the majority selection receiving circuit selectives reception signals which are most matched with one another. For this reason, the same signal as that input into the input terminal on one end is output to the output terminal on the other end. If an error occurs on the reception signal communicated by means of one signal line due to disturbance, this reception signal where the error occurs does not match with the normal reception signals communicated by means of the other two signal lines. However, since the residual two normal reception signals match with each other, the majority selection receiving circuit can select and receive the normal reception signals at real time.

The signal line is preferably composed of a wire made of metal such as copper or silver with high electric conductivity, and at least three signal lines are provided so that selection according to majority voting can be made. The number of signal lines may be four or more, and as the number is increased more and more, the reliability can be further heightened by the majority selection. The signal lines are not simply wires, and also coaxial wires having magnetic shield layers on their outsides. As a result, the signal lines are hardly influenced by noises, and this is preferable. Further, the three signal lines may be bundled and be provided with a magnetic shield. It goes without saying that logical signal lines including power line communication and wireless may be formed as the signal lines.

It is preferable that the signal to be input into the input terminal on one side is a contact input signal that is ON/OFF by switching using an electromagnetic relay or a semiconductor, and for example, when the input terminal is pulled up, the contact input signal in ON state (active state where the signal input is present) is at Low level, and the signal in OFF state (a released state where no signal input is present) is at High level. On the contrary, when the input terminal is pulled down, the contact input signal in ON state is at High level, and the signal in OFF state is at Low level. In addition, when the input section is set to an intermediate potential in an opened state, the contact input signal in ON state can be contact input at High/Low level, and in OFF state, the input terminal is at high impedance level (floating level), namely, the signal has three states.

The signal distributing section may be simply a branch connecting section, but it is preferable that a buffer circuit (shaping/amplifying circuit) for amplifying a voltage or an electric current to be output to the signal lines is provided.

The majority selection receiving circuit preferably has a comparator for comparing signals communicated via the signal lines at real time. A wire harness is formed with a connector. The connector is formed so as to include the signal distributing section formed on one end of the communication line and the majority selection receiving circuit formed on the other end. The wire harness can be replaced by the conventional signal cable so as to be used, and the wire harness is easily incorporated into an automatic control system that does not include an arithmetic processing device, so that reliability can be heightened.

A second aspect provides a communication circuit characterized by including a communication line comprising three or more signal lines, a signal distributing section, that is connected to both ends of the communication line, for distributing and transmitting a signal input into an input/output terminal to the signal lines, a majority selection receiving circuit for comparing a plurality of reception signals received via the signal lines and selectively receiving reception signals which are most matched with one another as true so as to output them to the input/output terminal, and a time division communication control section for switching communication directions of the signal distributing section and the majority selection receiving circuit at time-divided timing so as to hold bidirectional communication.

When a signal is input into the input/output terminal on one end of the communication line, the signal is distributed and transmitted to the signal lines by the signal distributing section. For this reason, the same signals are transmitted to the other end by the signal lines. On the other end, the reception signals received via the signal lines are compared, and the majority selection receiving circuit selects reception signals which are most matched with one another. For this reason, the same signals as that input into one end is output form the other end. It goes without saying that logical signal lines including power line communication and wireless may be formed as the signal lines.

The time division communication control section makes a control so that a signal is transmitted from one end to the other end in a state that a signal is input into the one end and input of a signal into the other end is inhibited. On the contrary, the time division communication control section makes a control so that a signal is transmitted from the other end to one end in a state that a signal is input into the other end and input of a signal into one end is inhibited. As a result, the communication direction is switched at the time-divided timing. The time division communication control section connected to the ends of the communication line preferably make a synchronous control such that signals are transmitted by the signal distributing section at the ends at synchronous timing such as a token passing system where the signals do not overlap. As a result, collision of signals can be securely prevented. When a host station that generates a token call is not present in the communication circuit, the time division control section spontaneously generates a token call, so that the communication circuit can be allowed to perform a degenerating operation even at the time of disconnecting the communication circuit.

If defective communication occurs in one signal line due to disturbance, a reception signal where an error occurs does not match with the other normal reception signals communicated via the other two signal lines, and the majority selection receiving section selects and receives the normal reception signals at real time. The signal lines are preferably composed of wires made of metal having high electric conductivity, and as the larger the number of the signal lines is, the higher the reliability can be. The signal lines are preferably coaxial wires, and the three signal lines are bundled and a magnetic shield may be provided.

It is preferable that the signal input into both ends of the communication line is a contact input signal, and the contact input signal is a binary signal that is at High level or Low level in ON state (signal is inputted) and is at opposite level in OFF state. In another way, it is preferable that the contact input signal is in three states including states that the High and Low signals are input and a state of high-impedance (floating level) at the time of no signal input. The signal distributing section may be simply a branch connecting section, but is preferably have a buffer circuit for amplifying a voltage or an electric current to be output to the signal lines. The majority selection receiving circuit preferably has a comparator for comparing signals communicated via the signal lines at real time.

A wire harness is formed by forming connectors including the signal distributing section and the majority selection receiving circuit at both ends of the communication line. The wire harness can be replaced by the conventional signal cable so as to be used, and this is easily incorporated into an automatic control system that does not include an arithmetic processing device, so that reliability can be heightened.

A third aspect provides a communication circuit characterized by including a communication line comprising three or more signal lines, a signal distributing section for distributing parallel signals input into a plurality of input/output terminals at both ends of the communication line, respectively, according to the number of signal lines, and converting the parallel signals into serial signals so as to transmit them to the signal lines, a majority selection receiving circuit for comparing the plurality of serial signals received via the signal lines and selecting serial signals which are most matched with one another as true and converting them into parallel signals so as to output them to the input/output terminals, and a time division communication control section for switching communication directions of the signal distributing section and the majority selection receiving circuit at time-divided timing.

Since the parallel signals input into the input/output terminals at one end of the communication line are converted into the serial signals by the signal distributing section and are distributed to be transmitted to the signal lines, the same serial signals are transmitted to the other end by the signal lines. On the other side, the majority selection receiving circuit converts the serial signals received via the signal lines into parallel signals and compares the reception signals, and selectively receives the reception signals which are most matched with one another. For this reason, the same parallel signals input into one end are output to the input/output terminals at the other end. In addition, the time division communication control section preferably makes a synchronous control such as a token passing system at synchronous timing where the signals do not overlap. As a result, collision of signals can be securely prevented. When a host station that generates a token call is not present in the communication circuit, the time division control section spontaneously generates a token call, so that the communication circuit can be allowed to perform a degenerating operation even at the time of disconnecting the communication circuit.

If defective communication occurs in one signal line, a reception signal where an error occurs does not match with the other normal reception signals communicated via the other two signal lines, and the majority selection receiving section selects and receives the normal reception signals at real time. The majority selection receiving section converts the serial signal into the parallel signals before majority selection, and thus more specific real-time communication can be held. On the other hand, when the majority selection is made after the parallel conversion is performed, the majority voting selective reception can be carried out excluding a signal where an error occurs. For this reason, the communication with higher reliability can be held.

The signal lines are preferably composed of wires made of metal with high electric conductivity, and as the number of the signal lines is larger, the reliability can be further heightened. The signal lines are preferably coaxial wires, and the three signal lines may be bundled and a magnetic shield may be provided. It goes without saying that logical signal lines including power line communication and wireless may be formed as the signal lines.

The signals to be input into both ends of the communication line are preferably contact input signals, and the contact input signals are binary signals that are at High level or Low level in ON state and at an opposite level in Off state. In another way, the contact input signals are preferably in three states including ON states where High and Low signals are input and at a high-impedance level (floating level) in OFF state. The signal distributing section may be simply a branch connecting section, but preferably has a buffer circuit for amplifying a voltage or an electric current to be output to the signal lines. The majority selection receiving circuit preferably has a comparator for comparing signals communicated via the signal lines at real time.

Since the signal distributing section distributes signals to the signal lines after serial conversion, one serial converting section can be provided. However, when parallel signals that are distributed previously according to the number of the signal lines are serially converted, an influence of a defective operation in the serial converting section can be eliminated by the majority selection.

A wire harness is formed by forming connectors including the signal distributing section and the majority selection receiving circuit, respectively, at both ends of the communication line. The wire harness can be replaced by the conventional signal cable so as to be used, and this is easily incorporated into an automatic control system that does not include an arithmetic processing device, so that reliability can be heightened.

The majority selection receiving circuit has a converting circuit, that are connected to the signal lines, for converting serial signals into parallel signals, a comparing circuit for comparing the plurality of converted parallel signals in unit of parallel signal group, and a selecting circuit for selecting parallel signals which are most matched with one another using the compared result of the comparing circuit. In this case, since the comparing circuit compares the signals parallel-converted by the converting circuit in unit of parallel signal group, the selecting circuit can discriminate properly communicable signals easily and securely. Further, since the converting circuit, the comparing circuit and the selecting circuit select a reception signal that is the most reliable according to a logical operation, they can select the signal at real time without a delay.

An input/output circuit for outputting the parallel signals selectively received by the majority selection receiving circuit via the input/output terminals and interlocking the input/output terminal used for outputting the signals so that no signal is input via the input/output terminal is provided. In this case, since the input/output circuit interlocks the input/output terminal that outputs a signal so that no signal is input thereinto, the communication direction can be switched according to input signals.

The communication line is branched and connected on the wiring branching, section, and the signal distributing section, the majority selection receiving circuit and the time division communication control section are provided to the terminals of the respective signal lines branched and connected. A storage circuit for storing signals received from the terminals of the signal lines branched and connected, and an OR operating circuit for setting a logical sum of the signals at the terminals of the signal lines stored in the storage circuit as a reception signal are provide. In this case, the reception signal can be received and output also at the terminals of the signal lines branched and connected. Further, when a signal is input into any terminal, a logical sum of the signals stored in the storage circuits at the other terminals is output. For this reason, the signal flow direction can be easily and clearly adjusted, and thus the collision of the signals does not occur.

A plurality of internal signal output sections for outputting the signals received by the majority selection receiving circuit, and a plurality of internal signal input sections for inputting signals transmitted to the signal lines via the signal distributing section, and a grid-shaped wire connecting circuit for connecting the internal signal output section and the internal signal input section arbitrarily so as to switch a connecting state between the input/output terminals are provided. In this case, the internal signal output sections and the internal signal input sections are connected or disconnected only by switching the connection by means of the grid type wire connecting circuit. For this reason, the wire connecting state between the input/output terminals can be freely set by setting of the grid shaped wire connecting circuit.

When a relay connecting section, that is directly connected to the grid-shaped wire connecting circuit, for relaying the signals is provided, an input/output terminal such as a monitor device for maintenance can be connected to the relay connecting section. When the communication circuit of the present invention is a wire harness where the relay connecting section is formed in a relay connector provided to a relay end, the wire harnesses are easily connected to each other so as to form a network.

A fourth aspect provides a communication network formed by connecting a plurality of communication circuits into a netlike pattern via the grid-shaped connecting circuit. The grid-shaped wire connecting circuit comprises a programmable logic device, and the internal signal output section has a writing port for writing wire connecting information, and the majority selection receiving circuit has a reliability monitoring circuit for counting how many times defective communication occurs and/or how many times proper reception cannot be carried out so as to obtain reliability of the signal lines. The communication network has a wire connection adjusting section for adjusting wire connecting states obtained by the grid-shaped wire connecting circuits so that the communication lines with low reliability are bypassed on positions where the reliability monitoring circuits and the writing port of every communication circuit are communicable.

Since the communication network according to the present invention is formed by connecting a plurality of communication lines into a netlike pattern, a signal input into one input/output terminal on the communication network is transmitted via the plurality of communication lines, and is output into the input-output terminal provided on another communication circuit connected by the grid-shaped wire connecting circuit. Further, since the grid-shaped wire connecting circuit comprises the programmable logic device such as FPGA, the wire connecting state can be adjusted dynamically by the wire connection adjusting section. Since the majority selection receiving circuit has the reliability monitoring circuit, when a determination is made that the reliability of the communication circuit is low due to various noises and deteriorations, the wire connecting state of the grid-shaped wire connecting circuit can be changed dynamically without this communication circuit.

That is to say, in the communication network of the present invention, the plurality of communication circuits can hold communication according to the majority selection of higher reliability, and also when defective communication due to disconnection or characteristic deterioration that cannot be avoided occurs on one communication circuit, the signals can be transmitted so as to bypass the communication circuit where the defective communication occurs. As a result, the communication with higher reliability can be held. It is more preferable that when the signal distributing sections connected to the communication circuits, respectively, generate token calls actively so as to hold degenerating communication at the time of disconnecting the signal lines. The communication network that holds the communication with higher reliability is suitable for wiring on a portion requiring high reliability in automatic control devices to be incorporated into transporting means such as an automobile, an airplane, a ship and a rocket, and devices such as robot.

A fifth aspect provides a connecting apparatus characterized by including relay input/output terminals connected to input/output terminals of at least two communication circuits, internal signal output sections for outputting signals received from every relay input/output terminal, internal signal input sections for inputting the signals transmitted from every relay input/output terminals, an input/output circuit for outputting parallel signals input into the internal signal input sections via the relay input/output terminals and interlocking to prevent input of another signal via the relay input/output terminal outputting the signals, and simultaneously outputting the signals input via the relay input/output terminals via the internal signal output sections, and a grid-shaped wire connecting circuit for connecting the internal signal output sections and the internal signal input sections arbitrarily so as to switch a connecting state between the input/output terminals.

The connecting apparatus of the present invention connects the input/output terminals of the at least two communication circuits to the relay input/output terminals so as to relay the signal input into any input/output terminal in one communication circuit so as to be capable of outputting the signal to the input/output terminal of another communication circuit. That is to say, the signal input into the input/output terminal of one communication circuit is output to the internal signal output section to which this is connected, and this signal is input into the internal signal input section via the grid-shaped wire connecting circuit so as to be capable of relaying it to another communication circuit.

When the communication circuit is a wire harness, the connecting apparatus becomes a repeater of the wire harness. Further, when the relay input/output terminals are provided so that the three or more communication circuits can be connected to one connecting apparatus, the connecting apparatus becomes a branch connecting apparatus of the communication circuits.

The grid-shaped wire connecting circuit comprises the programmable logic device, and a writing port for writing wire connecting information into the programmable logic device so as to enable the wire connecting state by means of the grid-shaped wire connecting circuit to be adjustable is provided. In this case, the relay of signals by means of the connecting apparatus can be dynamically changed. That is to say, while the communication circuit with low reliability is operating, this circuit can be dynamically bypassed easily. The writing port is provided to internal signal output section, so that contents to be output to the writing port can be transmitted by communication.

The communication circuits from the first to third aspects allow the same signals to communicate using the three or more signal lines, and can eliminate an influence of disturbance in unit of communication circuit at real time by means of majority selection. That is to say, a good balance can be achieved between a high-speed response and high reliability. In addition, since the communication circuit of the present invention can be replaced by a conventional communication circuit so as to be used, in order to secure the conventional high reliability, the on/off contact signal can be transmitted without a CPU that is comparatively expensive and causes a defective operation and a delay of a process.

When the signal lines are branched and connected in the wire branching section, a signal to be input/output to the input/output terminals can be shared on two or more separated positions.

The communication network from the fourth aspect is formed by using a plurality of communication circuits, so that the reliability of the communication can be further heightened.

The connecting apparatus from the fifth aspect can relay and connect or branch and connect a plurality of communication circuits easily.

DETAILED DESCRIPTION OF PREFERRED EMBODIMENTS

Preferred embodiments are described in detail below with reference to the accompanying drawings.

Figure 1:
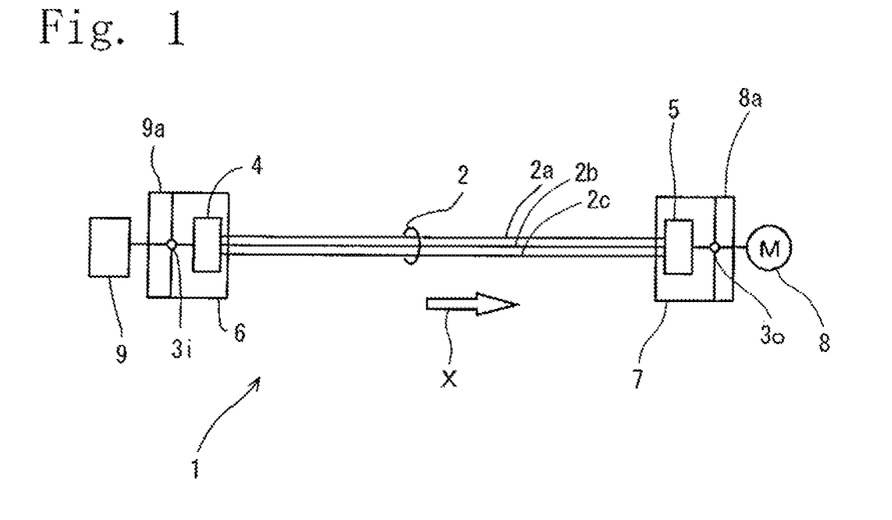
FIG. 1 is a diagram illustrating an entire configuration of a communication circuit according to a first embodiment of the present invention.
Figure 2:
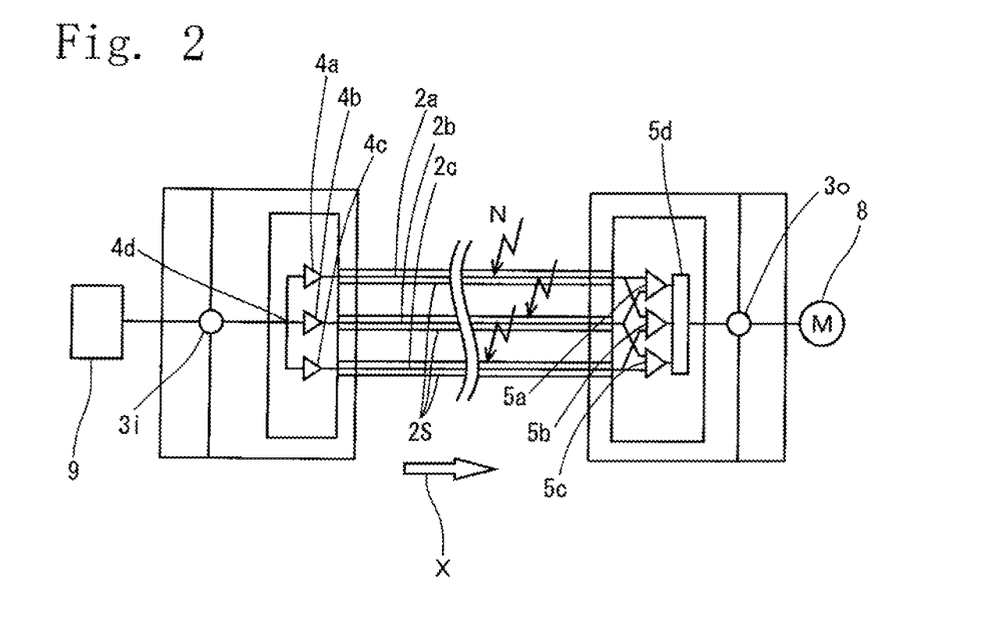
FIG. 2 is a diagram illustrating an enlarged main section of the communication circuit shown in FIG. 1.

FIGS. 1 and 2 are diagrams describing a configuration of a communication circuit 1 according to a first embodiment of the present invention.

As shown in FIGS. 1 and 2, the communication circuit 1 according to the first embodiment has a communication line 2, a signal distributing section 4, and a majority selection receiving circuit 5. The communication line 2 comprises three signal lines 2a, 2b and 2c. The signal distributing section 4 is connected to one end of the communication line 2, and distributes and transmits a signal input into an input terminal 3i to the signal lines 2a, 2b and 2c. The majority selection receiving circuit 5 is connected to the other end of the communication line 2, and compares a plurality of reception signals received via the signal lines 2a, 2b and 2c so as to selectively receive the reception signals which are most matched with one another as true and output them to an output terminal 3o.

A connector 6 houses the input terminal 3i and the signal distributing section 4, and a connector 7 houses the majority selection receiving circuit 5 and the output terminal 3o. The communication circuit 1 of the present invention is a wire harness that can connect a control target 8 (e.g. a motor M or the like) to a control device 9. The control target 8 and the control device 9 have connectors 8a and 9a connectable to the wire harness 1, and the connectors 6 and 7 of the wire harness 1 can be connected to the connectors 8a and 9a.

As shown in FIG. 2, the signal lines 2a, 2b and 2c are coaxial cables having magnetic shields 2s made of mesh-shaped conductors, and these magnetic shields 2s are connected to grounds of the signal distributing section 4 and the majority selection receiving circuit 5. The communication circuit 1 of the present invention may have three or more signal lines 2a, 2b and the like.

The input terminal 3i and the output terminal 3o form connecting terminals of the connectors 6 and 7, and are made of plugs or receptacles. For easy description, in the first embodiment, one terminal is provided to each of the connectors 6 and 7.

The signal distributing section 4 has a plurality of buffers 4a, 4b and 4c according to the number of signal lines 2a, 2b and 2c, and these buffers 4a, 4b and 4c solve insufficient electric current due to branching of a signal in a branching section 4d.

The majority selection receiving circuit 5 has comparators 5a, 5b and 5c and a selecting circuit 5d. The comparators 5a, 5b and 5c compare two of reception signals received via the signal lines 2a, 2b and 2c. The selecting circuit 5d selects reception signals which are most matched with one another based on the compared result in the comparators 5a, 5b and 5c. A hardware process enables majority selection receiving.

Therefore, the communication circuit 1 having the above configuration is replaced by the wire harness used as a normal communication line, so that the signals can be transmitted to a direction of arrow X and reliability of the communication can be greatly heightened. For example, even when a noise N occurs on the signal lines 2a, 2b and 2c due to disturbance, the magnetic shields 2s absorb most of the noise N. That is to say, the three signals received via the three signal lines 2a, 2b and 2c are the same, and all the comparators 5a, 5b and 5c output matching. For this reason, the selecting circuit 5d may receive a signal from any of the signal lines 2a, 2b and 2c, and may select any signal as a true value.

As one example, when information communicated through the signal line 2a is inverted by an influence of the noise N, a signal received via the signal line 2a does not match with signals received via the other signal lines 2b and 2c. As a result, the comparators 5a and 5b output mismatch, and only the comparator 5c outputs match. For this reason, the selecting circuit 5d selects any one of the matched signals received via the signal lines 2b and 2c so as to output the selected signal to the output terminal 3o.

That is to say, even when the noise N enters any one of the three signal lines 2a, 2b and 2c and an error enters a signal, the signal input into the input terminal 3i is output to the output terminal 3o properly at real time. For this reason, the control target (e.g. the motor M or the like) is properly controlled by a control signal from the control device 9. A signal process is not executed by using CPU at the time of transmission and reception of the signals, and thus the proper signal can be output without a delay. Therefore, the communication circuit 1 of the present invention can be used for a portion requiring high reliability in a simpler automatic control system as exemplified in the first embodiment.

In the first embodiment, since the coaxial cables are adopted as the signal lines 2a, 2b and 2c, the influence of the external noise N is hardly exerted, but these signal lines 2a, 2b and 2c may be electric wires made of metal such as copper or silver. In the first embodiment, since one input terminal 3i and one output terminal 3o are provided to one connector 6 and one connector 7, respectively, signals are continuously transmitted without changing over a switch. However, when a plurality of input terminals 3i and output terminals 3o are provided to one connector 6 and one connector 7, respectively, a plurality of signals can be transmitted by time-division serial communication.

Figure 3:
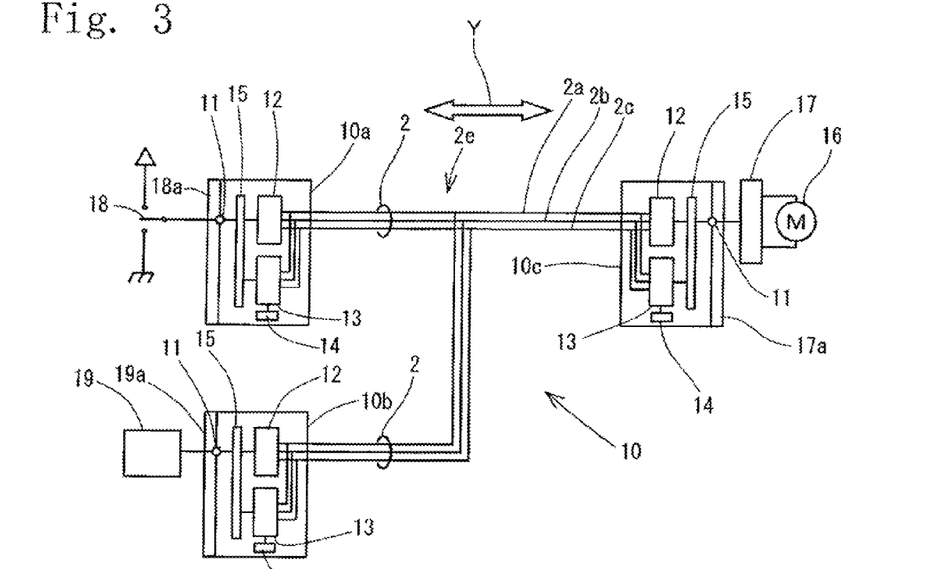
FIG. 3 is a diagram illustrating an entire configuration of the communication circuit according to a second embodiment.
Figure 4:
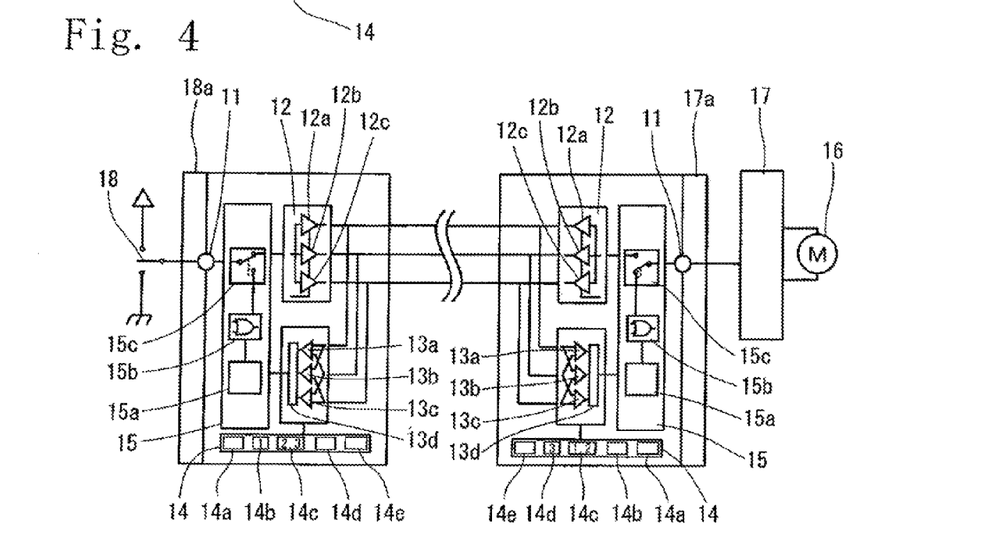
FIG. 4 is a diagram illustrating an enlarged main section of the communication circuit shown in FIG. 3.

FIGS. 3 and 4 are diagrams illustrating a configuration of the communication circuit 10 according to a second embodiment. In the following description, since the members having the same reference symbols as those in FIGS. 1 and 2 are the same as or equivalent to members in FIGS. 1 and 2, detailed description thereof is omitted so that the overlapped description is avoided.

As shown in FIGS. 3 and 4, the communication circuit 10 according to the second embodiment has the communication line 2, signal distributing sections 12, majority selection receiving circuits 13, time division communication control sections 14, and output circuits 15. The communication line 2 comprises three or more signal lines 2a, 2b and 2c. The signal distributing section 12 is connected to a terminal of the communication line 2, distributes and transmits a signal input into an input/output terminal 11 to the signal lines 2a, 2b and 2c. The majority selection receiving circuit 13 compares a plurality of reception signals received via the signal lines 2a, 2b and 2c, and selectively receives the reception signals which are most matched with one another as true so as to output the signals to the input/output terminal 11. The time division communication control section 14 switches communication directions of the signal distributing section 12 and the majority selection receiving circuit 13 at time-divided timing so as to hold bidirectional communication. The input/output circuit 15 outputs the signal selectively received by the majority selection receiving circuit 13, and when outputting the signal, interlocks so as not to input a signal. A wiring branching section 2e is provided to the communication line 2.

Since in the communication circuit 10 according to the second embodiment, the communication line 2 is branched and connected by the wiring branching section 2e, the communication line 2 has three terminals. The communication circuit 10 is a wire harness where connectors 10a to 10c are provided to the terminals, respectively. A number of branching of the communication line 2 is determined by a number of devices that output control signals for controlling the motor 16. The second embodiment describes an example where the communication line 2 has the three terminals in order to simplify the description, but it goes without saying that the number of branching can be adjusted freely if necessary.

The input/output terminals 11 form connecting terminals of the connectors 10a to 10c, respectively, and the input/output terminals 11 of the communication line are made of plugs or receptacles, and the second embodiment describes an example where one input/output terminal is provided to each of the connectors 10a to 10c in order to simplify the description. When a plurality of input/output terminals 11 is provided to each of the connectors 10a to 10c, signals input into the input/output terminals 11 by the signal distributing sections 12 are converted into serial signals so as to be capable of being transmitted in time division.

The signal distributing section 12 outputs input signals from input/output terminals 11 as any one of ON signals at High level and Low level, and an OFF signal of high impedance (three-state signals) to the signal lines 2a, 2b and 2c at timing determined by the time division communication control section 14. As shown in FIG. 4, signal distributing section 12 has three-state buffers 12a, 12b and 12c provided according to the number of signal lines 2a, 2b and 2c. A voltage level of the three-state buffers 12a, 12b and 12c at the time of high impedance is set to be a voltage level between the High level and the Low level (hereinafter, a Mid level).

The majority selection receiving circuit 13 has comparators 13a, 13b and 13c that compares two of reception signals received via the signal lines 2a, 2b and 2c, and a selecting circuit 13d that selects reception signals which are most matched with one another by using a comparison result from the comparators 13a, 13b and 13c. The majority selection receiving circuit 13 enables majority selection receiving according to a hardware process.

The time division communication control section 14 is for holding synchronous communication using a token passing system, and has a token call control section 14a, an SS (Sending Slot) storage section 14b, an RS (Receiving Slot) storage section 14c, a signal transmission control section 14d and a signal reception control section 14e. The token call control section 14a has an arbitration function for positively sending a token signal. The SS storage section 14b stores a node number of a self station. The RS storage section 14c records a node number of reception station. The signal transmission control section 14d outputs a signal to the signal distributing section 12 according to a synchronous timing at which the self station node recorded in the SS storage section 14b is allocated by the token signal. The signal reception control section 14e allows the majority selection receiving circuit 13 to receive signals from multi-station nodes stored in the RS storage section 14c.

The input/output circuit 15 connects the input/output terminal 11 to the signal distributing section 12 or the majority selection receiving circuit 13 in a switching manner, and thus interlocks so as not to input a signal from the input/output terminal 11 into the signal distributing section 12 when the signal from the majority selection receiving circuit 13 is output to the input/output terminal 11. The input/output circuit 15 has a storage circuit 15a, a OR operating circuit 15b, and a switching circuit 15c. The storage circuit 15a once stores an ON/OFF state and voltage level of reception signals from multi-nodes recorded in the RS storage section 14c for one or more token cycle. The OR operating circuit 15b operates a logical sum in a state that the signals stored in the storage circuit 15a are in ON state, and obtains a license of the communication line 2. The switching circuit 15c changes over the switch so that when any one of the reception signals from the multi-nodes recorded into the RS storage section 14c proves to be in ON state by the logical OR operation of the OR operating circuit 15b, a voltage level of the reception signal is output to the input/output terminal 11.

A motor 16 locks and unlocks doors of an automobile, and a motor driver 17 supplies an electric power to the motor 16. An operation switch 18 locks/unlocks the doors according to a user's input operation, and an electronic control unit 19 sends a control signal to the motor driver 17 according to remote control by means of an electromagnetic wave. The motor driver 17, the operation switch 18 and the electronic control unit 19 have connectors 17a, 18a and 19a, respectively. The connectors 17a, 18a and 19a are connected to the connectors 10a, 10b and 10c of the communication circuit 10, respectively, so that the respective members 17, 18 and 19 are connected to each other by a wiring system of the communication circuit 10.

An operation of the wiring system using the communication circuit 1 is described below with reference to FIG. 5. It is supposed that addresses "1", "2" and "3" are set in the SS storage sections 14b for respective nodes (the input/output terminals 11 of the connectors 10a to 10c) connected to the motor 16, the operation switch 18 and the electronic control unit 19, respectively. At this time, addresses "2, 3", "1, 3" and "1, 2" of multi-nodes are set in the RS storage sections 14c.

When a predetermined time passes in a state of no token call, each of the token call control sections 14a at each of the nodes actively generates a call. However, the timing at which token is called is shifted according to the information stored in the SS storage sections 14b, and thus the token call control section 14a at the node with SS number "1" with the highest priority (the input/output terminal 11 of the connector 10a to which the operation switch 18 is installed) is selected as a bus master so as to call tokens T1 to T3 and determine entire synchronous timing. In the second embodiment, since three nodes are present in the communication circuit 10, the token call control section 14a generates the tokens T1 to T3 according to its number at each predetermined time (slot cycle) T.

The respective nodes transmit to the communication line 2 the self node numbers "#1" to "#3" and the signals input into the input/output terminals 11 at the synchronous timings given to the self stations. When no signal is input into the input/output terminals 11, a Mid level (OFF state) is transmitted. Waveforms S1 to S3 shown in FIG. 5 represent signals to be transmitted to the communication line 2 by the signal distributing sections 12 in the connectors 10a to 10c, and one example is described with reference to a solid line, and a fluctuation range of the signal is shown by a dotted line. SW represents an input signal from the operation switch 18, and Mot represents an output signal to the motor driver 17.

Figure 5:
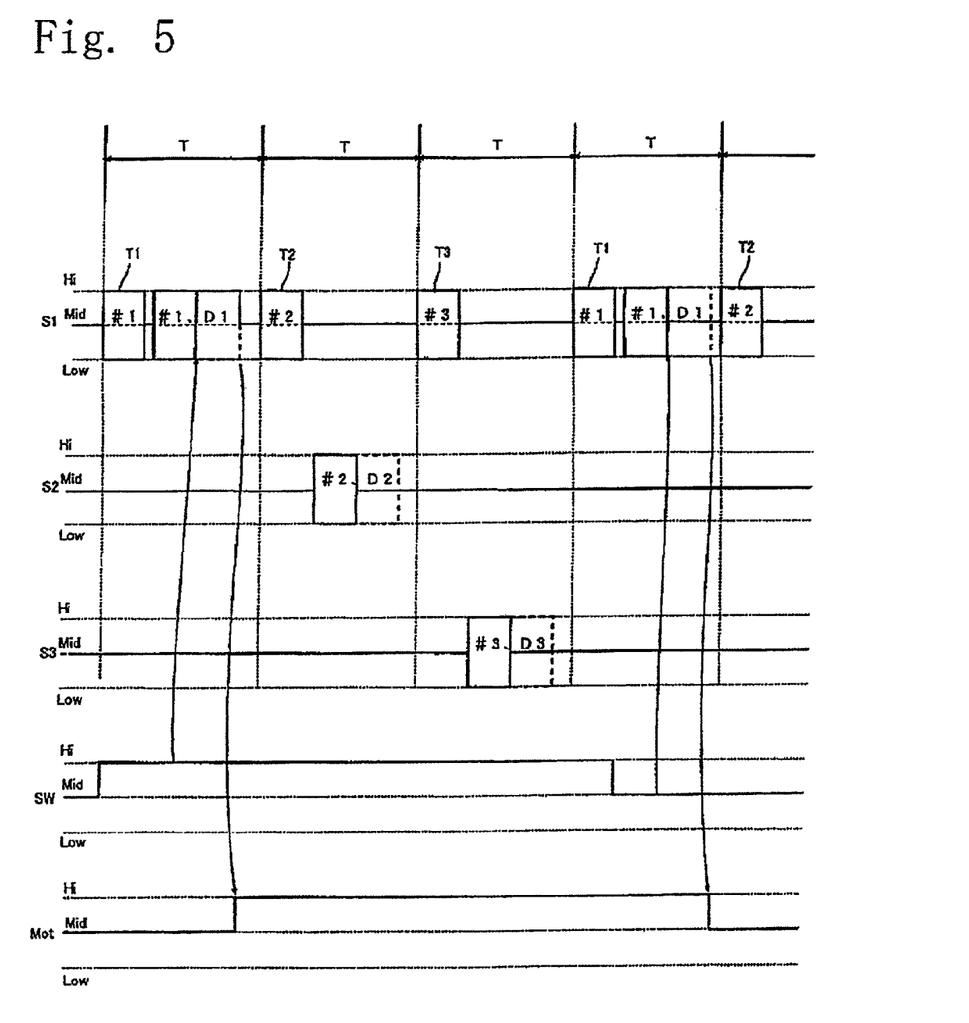
FIG. 5 is a diagram describing an operation of the communication circuit.

When the operation switch 18 is operated at the time of calling the first token T1 in FIG. 5 and a High level is input, the signal distributing section 12 in the connector 10a transmits the self station node number "#1" and then a High level to the communication line 2 according to an input signal. The majority selection receiving circuit 13 in the connector 10b receives this signal and outputs it to the input/output terminal 11. That is to say, when the High level is output to the motor driver 17 and a driving current is applied to the motor 16, the motor 16 rotates to a regular direction. When the input voltage level is at Low level, the motor 16 rotates in a reverse direction. That is to say, the motor 16 is rotated to the regular and reverse directions by the switch SW so that an automobile can be locked or unlocked.

At the same time, the reception of the High-level signal from the node "1" is stored in the storage circuits 15a provided to the input/output circuits 15 at the nodes with numbers "2" and "3", and the received voltage signal at High level is output to the input/output terminals 11. Further, the OR operating circuits 15b detect a node from which an ON signal is input into the storage circuits 15a, and the switching circuit 15c is switched to interlock and prevent the signal input from the input-terminal 11.

That is to say, in the state that the switching circuit 15c is switched, a contact input signal input into the input/output terminal 11 with the node number "1" is output directly to the input/output terminals 11 with the node numbers "2" and "3". As a result, the input/output terminals 11 in the connectors 10a to 10c are connected directly by the communication line in a pseudo manner. The contact input signal can communicate bidirectionally as shown by a bidirectional arrow Y in FIG. 3, but the interlocking is given by the input/output circuit 15, so that collision of signals is prevented even when conflicting input is performed at both ends of the communication circuit 10. This is an effect that can be obtained because the communication circuit 10 holds the synchronous communication.

That is to say, since the interlock is not released until the contact input signal into the input/output terminal 11 at the node number "1" is in OFF state at a next synchronous cycle, a problem such that the communication circuit is damaged by collision of signals does not arise. In the example shown in FIG. 5, the operation switch 18 is in OFF state until second synchronous timing comes at the node with number "1". For this reason, the transmission signal from the signal distributing section 12 at the node with number "1" is at a Mid level of the OFF state, and when the storage circuit 15a is cleared, the interlocking is released so that the contact input signals can be input from all the input/output terminals 11.

The second embodiment describes the example where when a three-state buffer is used in the second embodiment, two voltages (High level and Low level) in ON state and an intermediate voltage (Mid level) in OFF state might be generated as the signals to be transmitted to the signal lines 2a to 2c. However, the present invention is not limited to it. That is to say, a signal for identifying a 2-bit binary value that is a signal for identifying two ON states (High level and Low level), and a signal for identifying ON state or OFF state may be transmitted separately to the signal lines 2a to 2c. Further, as the buffers to be used for the signal transmission, open-collector type buffers are used in order to close to characteristics of a common bus, or power line communication or wireless communication are used. It goes without saying that such various modification can be considered.

Figure 6:
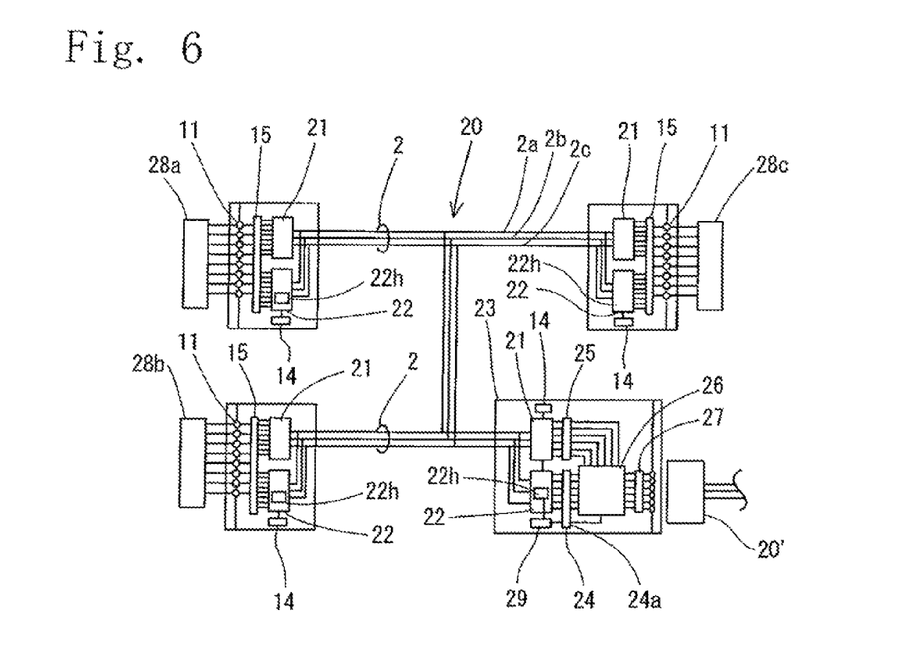
FIG. 6 is a diagram illustrating an entire configuration of the communication circuit according to a third embodiment.
Figure 7:
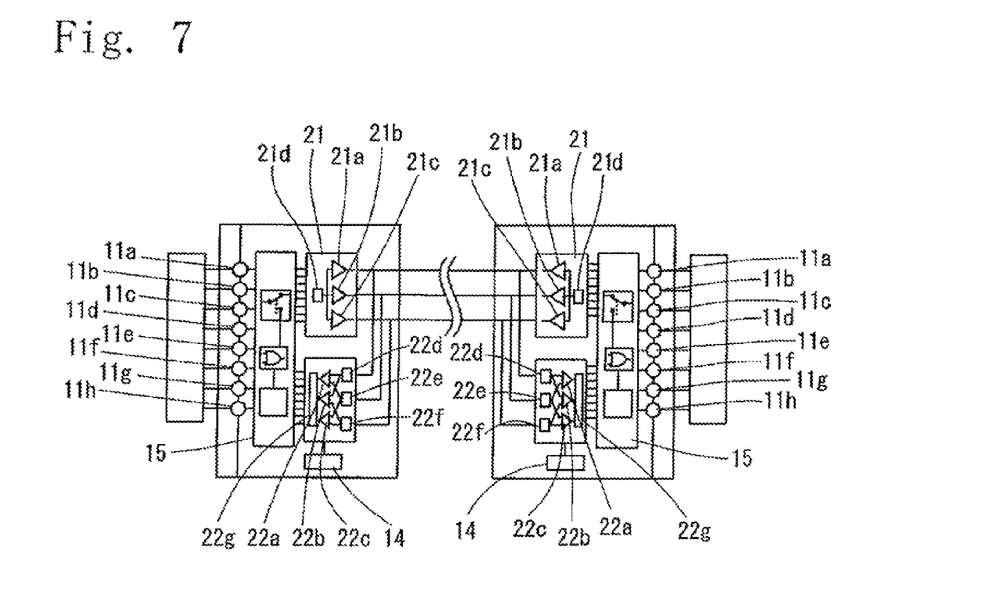
FIG. 7 is a diagram illustrating an enlarged main section of the communication circuit shown in FIG. 6.

FIGS. 6 and 7 are diagrams illustrating configurations of the communication circuit 20 according to a third embodiment of the present invention. In the following description, since the members denoted by the same reference symbols as those in FIGS. 1 to 5 are the same as or equivalents to those in FIGS. 1 to 5, detailed description thereof is omitted to avoid overlapped description.

As shown in FIGS. 6 and 7, the communication circuit 20 according to the third embodiment has the communication line 2, signal distributing sections 21, majority selection receiving circuits 22, the input/output circuits 15, and the time division communication control sections 14. The communication line 2 comprises three signal lines 2a to 2c. The signal distributing section 21 distributes parallel signals input into the plurality of input/output terminals 11 (11a to 11h) at both ends of the communication line 2 according to the number of the signal lines 2a to 2c and converts these signals into serial signals so as to transmit them to the signal lines 2a to 2c. The majority selection receiving circuit 22 compares the plurality of serial signals received via the signal lines 2a to 2c, and selects serial signals which are most matched with one another as true so as to convert them into parallel signals. The input/output circuit 15 outputs the parallel signals selectively received by the majority selection receiving circuit 22 via the input/output terminals 11 and interlocks to prevent the signal via the input/output terminal 11 that outputs a signal. The time division communication control section 14 switches the communication direction among the signal distributing section 21, the majority selection receiving circuit 22 and the input/output circuit 15 at time-divided timing.

A wire connection setting section 23 is branched and connected to the communication line 2 composing the communication circuit 20. The wire connection setting section 23 has a plurality of internal signal output sections 24, a plurality of internal signal input sections 25, a grid-shaped wire connecting circuit 26, and a relay connecting section 27. The internal signal output sections 24 output signals received by the majority selection receiving circuit 22, respectively. The internal signal input sections 25 input the signals to be transmitted to the communication line via the signal distributing section 21, respectively. The grid-shape wire connecting circuit 26 connects any internal signal output section 24 and any internal signal input section 25 so as to switch the connecting state between the input/output terminals 11. The relay connecting section 27 is connected to the grid-shape wire connecting circuit 26, and connects another communication circuit 20' so as to relay signals between the communication circuits 20 and 20'. 28a to 28c denote electronic circuits and devices to be controlled that automatically control ECU (Electric Control Unit) and the like to be connected to the plurality of input/output terminals 11.

The signal distributing section 21 according to the third embodiment is basically the same as the signal distributing sections 4 and 12 described in the first and second embodiments, but is different from them in that a converting circuit 21d for converting parallel signals into serial signals is provided before buffers 21a to 21c for distributing and outputting signals to the signal lines 2a to 2c. The buffers 21a to 21c output binary signals that are in ON state at Low level and in OFF state at High level. Therefore, the buffers 21a to 21c do not have to be three-state buffers. An input signal is first branched, a plurality of converting circuits 21d whose number is according to the number of signal lines 2a to 2c is provided. As a result, defective communication caused by a defective operation of the converting circuit 21d may be enabled to be eliminated by the majority selection receiving.

Similarly, the majority selection receiving circuit 22 is approximately the same as the majority selection receiving circuits 5 and 13, but they are different in that converting circuits 22d to 22f for converting serial signals into parallel signals are provided between comparators 22a to 22c and the signal lines 2a to 2c. Also in this case, after the converting circuits 22d to 22f are first used to parallel-convert signals, the comparators 22a to 22c compare the signals, and the selecting circuit 22g makes the majority selection. For this reason, defective communication caused by a defective operation of the converting circuits 22d to 22f can be also eliminated by the majority selection.

Since the input/output circuit 15 according to the third embodiment inputs/outputs a contact signal that is at a Low level in ON state, its control circuit can be formed by a simple switching element.

Figure 8:
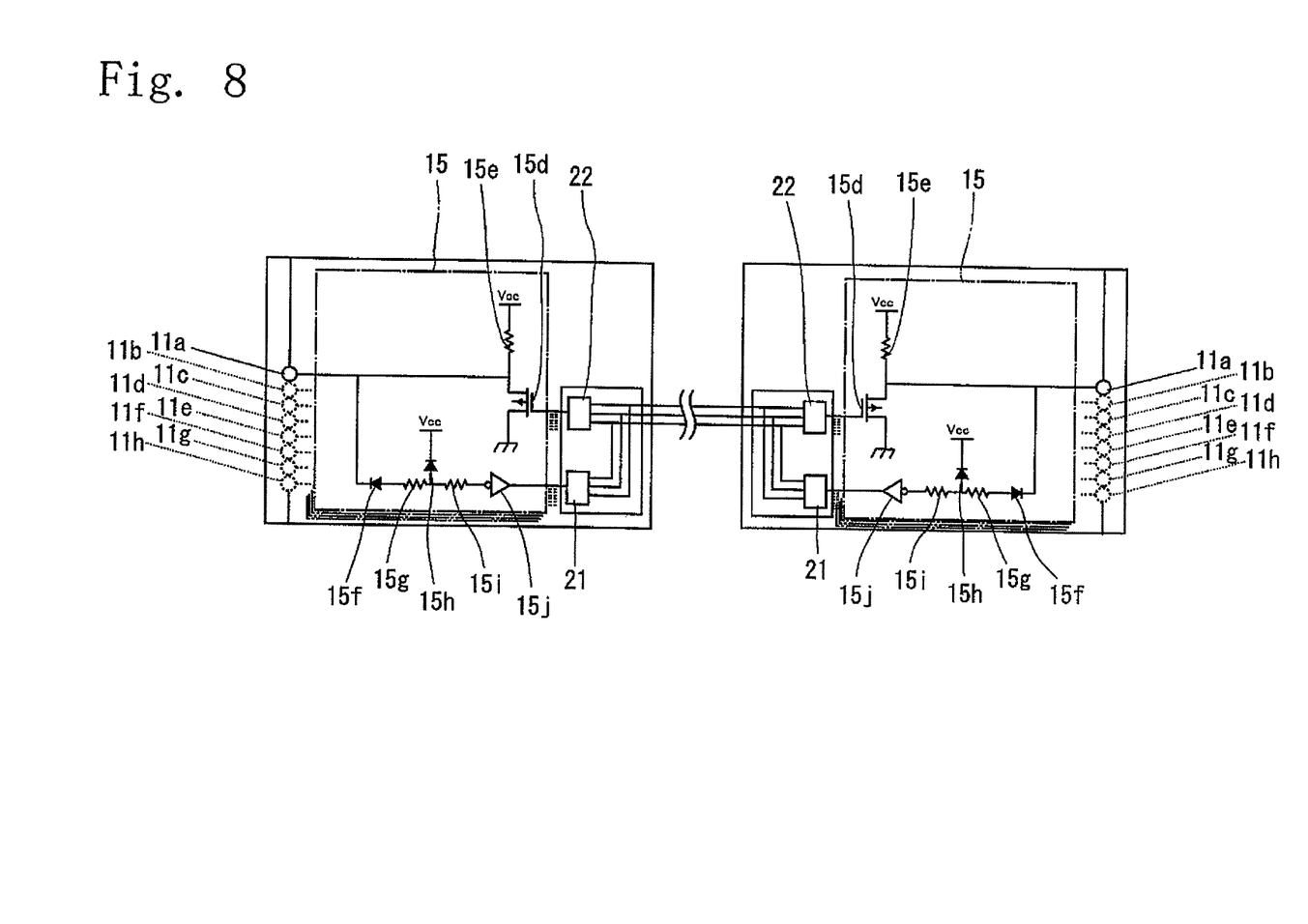
FIG. 8 is a diagram illustrating a concrete configuration of a detailed portion of the communication circuit.

FIG. 8 is a diagram illustrating one example of the input/output circuit 15 using a switching element. In FIG. 8, a switching element 15d such as FET is connected to the majority selection receiving circuit 22, and a pull-up resistor 15e is connected between the switching element 15d and a power supply Vcc. A diode 15f is connected to the switching element 15, the resistor 15e and the input/output terminal 11a, and resistors 15g and 15h are connected to the diode 15f in series. A diode 15i is connected between the resistors 15g and 15h and the power supply Vcc. A logical inverting circuit 15j is connected to the resistor 15h.

A circuit formed by a series of elements 15d to 15j inverts a signal received by the majority selection receiving circuit 22 to output it to the input/output terminal 11a. When the majority selection receiving circuit 22 is in ON state (High level), the circuit outputs the signal at Low level via the input/output terminal 11a, and interlocks to prevent input of a signal via the input/output terminal 11a. That is to say, only when an output signal from the majority selection receiving circuit 22 is in OFF state (Low level), a voltage at an input end of the logical inverting circuit 15j changes according to the voltage level of the input/output terminal 11a, and the inverted signal is input into the signal distributing section 21. With the provision of the input/output circuit 15, the communication circuit 20 enables the bidirectional communication according to the input signal into the input/output terminals 11a to 11h.

As the input/output circuit 15, a circuit is configured by simply combining elements such as diodes and transistors that perform simple operations. A complicated control circuit such as CPU is eliminated. As a result, the manufacturing cost can be reduced, and also occurrence of malfunctions can be prevented more securely.

Interlocking by the series of the elements 15d to 15j which are connected to the input/output terminals 11a to 11h are performed (not shown) about the on/off contact signal of each bit received by the majority selection receiving circuit 22. FIG. 8 illustrates only a main section in order to describe the part of the circuit configuration where the input signal is interlocked in detail. For this reason, it goes without saying that the description about various detailed members included in the communication circuit 20 are omitted.

With reference to FIGS. 6 and 7 again, the wire connection setting section 23 sets connection of wires selected arbitrarily from the input/output terminals 11, the internal signal output section 24 is an output port that outputs the same signal as that to be output to the input/output terminal 11 selected in advance, and the internal signal input section 25 is an input port that inputs the signal to be output to the input/output terminal 11. In the grid-shaped wire connecting circuit 26, wire connecting lines connected to the internal signal input sections 25 and the internal signal output sections 24 are arranged into a grid pattern and are placed on positions where the wires are desired to be connected, and the wire connecting lines are connected. At the present, the grid-shaped wire connecting circuit 26 can be easily formed by a programmable logic device.

A reliability monitoring circuit 22h is provided to the majority selection receiving circuit 22, and counts how many times defective communication occurs and/or how many times proper reception cannot be carried out so as to obtain reliability of the communication lines. A writing port 24a is provided to the internal signal output section 24, and writes information about the wire connection into the programmable logic device. A wire connection adjusting section 29 adjusts a state of the wire connection by mean of the respective grid-shaped wire connecting circuit 26 so that communication wires with low reliability are bypassed on positions communicable with the reliability monitoring circuit 22h and the writing port 24a of the communication circuits 20 and 20'.

In the third embodiment, the reliability of signals is secured, and the parallel signals comprising a lot of ON/OFF signals can communicate using only three signal lines. For this reason, the number of wirings is reduced, and thus simple wiring with less error can be carried out. Since the wire connecting state can be changed by the grid-shaped wire connecting circuit 26 and the hard constitution does not have to be changed, the maintenance can be done easily. The communication circuit 20 can connect a lot of ECUs like connection using a flat cable.

The reliability monitoring circuit 22h records a number of times of avoiding defective communication and a number of unavoidable times according to the majority selection so as to check the reliability of the communication circuit 20. For this reason, the wire connection adjusting section 29 can rewrite the wire connection information about the programmable logic device via the writing port 24a so that the communication circuit 20 with low reliability is bypassed. That is to say, the communication circuits 20 and 20' can be dynamically sorted out. The multiplexing in unit of the communication circuit 20 and 20' is realized, thereby securing higher reliability.

Figure 9:
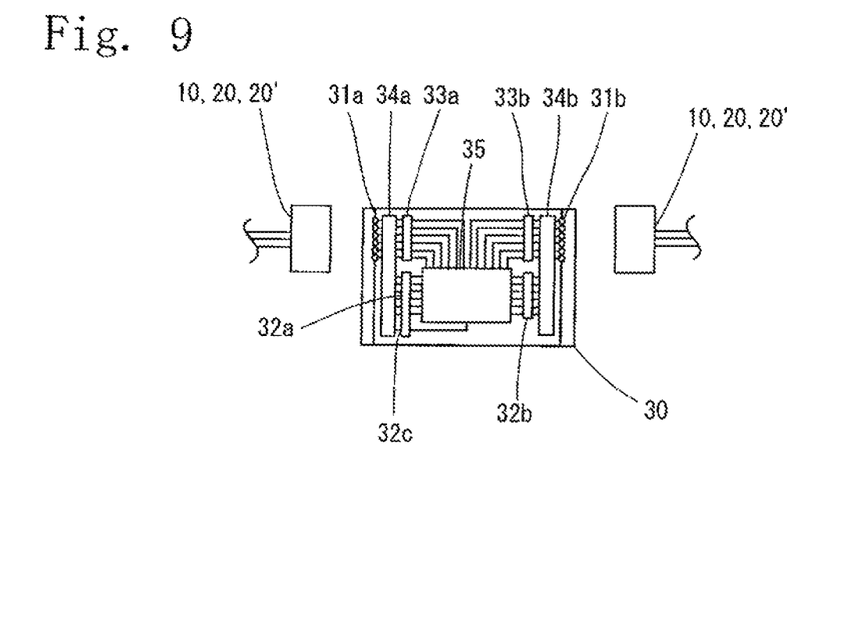
FIG. 9 is a diagram illustrating a constitution of a connecting apparatus according to the present invention.

FIG. 9 is a diagram illustrating a constitution of a wire connecting device 30 constituted so as to be capable of connecting the communication circuits 10, 20 and 20'. The connecting device 30 has relay input/output terminals 31a and 31b, internal signal output section 32a and 32b, internal signal input sections 33a and 33b, input/output circuits 34a and 34b, and a grid-shaped wire connecting circuit 35. The relay input/output terminals 31a and 31b are connected to the at least two input/output terminals 11a and 11b of the communication circuits 10 and 20 and 20'. The internal signal output sections 32a and 32b output signals received from the relay input/output terminals 31a and 31b, respectively. The internal signal input sections 33a and 33b input the signals transmitted from the relay input/output terminals 31a and 31b, respectively. The input/output circuits 34a and 34b output parallel signals input into the internal signal input sections 33a and 33b via the relay input/output terminals 31a and 31b and interlock to prevent signals from being input via the relay input/output terminals 31a and 31b, and simultaneously output signals input via the relay input/output terminals via the internal signal output sections. The grid-shaped wire connecting circuit 35 arbitrarily connects the internal signal output section 32a and 32b and the internal signal input section 33a and 33b so as to switch the connecting state of the input/output terminals 31a and 31b.

The relay input/output terminals 31a and 31b have the approximately same configuration as those of the input/output terminals 11, and are connectable to the input/output terminals 11 of the communication circuits 10, 20 and 20' to be connected. In the third embodiment, in order to simplify the drawings, the relay input/output terminals 31a and 31b are provided in two direction, but it goes without saying that a number and directions of the relay input/output terminals 31a and 31b to be provided can be arbitrarily set.

The internal signal output sections 32a and 32b and the internal signal input sections 33a and 33b are the same as the internal signal output sections 24 and the internal signal input sections 25 shown in FIG. 6. For this reason, detailed description of the constitutions is omitted. A writing port 32c is formed on any one of the internal signal output sections 32a and 32b.

The grid-shaped wire connecting circuit 35 is formed by the programmable logic device, and the wire connection information is written into the programmable logic device via the writing port 32c, so that the wire connecting state can be changed.

The connecting device according to the third embodiment composes a connecting adaptor of the wire harness, and this can form any communication network.

Figure 10:
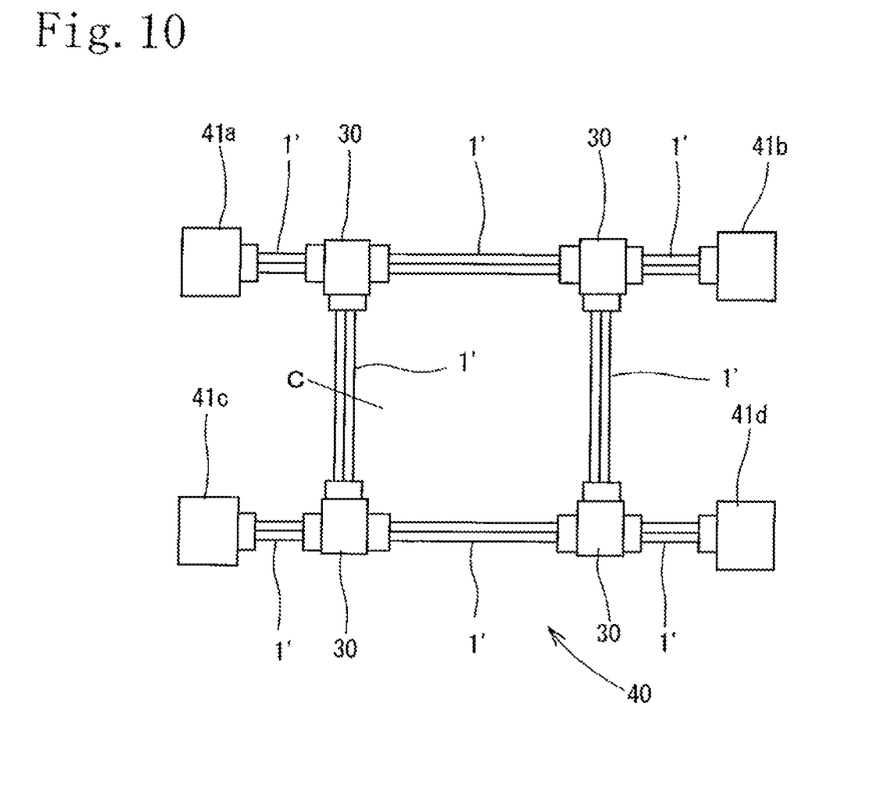
FIG. 10 is a diagram illustrating one example of a communication network using the communication circuit and the connecting apparatus of the present invention.

FIG. 10 is a diagram illustrating one example of a communication network 40 formed by using the connecting device 30. As shown in FIG. 10, the communication network 40 according to the third embodiment is an example where wire harnesses 1' formed by any one of the communication circuits 10, 20 and 20' are connected into a net shape via the connecting devices 30. Since ECUs 41a to 41d to be connected in the example are connected to by two routes, if one wire harness 1' is completely disconnected at a portion C and the communication is disabled, the reliability monitoring circuit 22h (see FIG. 6) provided to both ends of the wire harness 1' that cannot communicate detects the disconnection of the wire harness 1'. Further, the wire connection adjusting section 29 adjusts the wire connecting state. As a result, this network can dynamically cope with a communicable environment that is the same as that before the disconnection of the wire harness 1'.

In the third embodiment, the constitution that is as simple as possible is illustrated in order to simplify the description, but it goes without saying that the communication network 40 can be actually structured in order to secure three or more routes between important ECUs.

What is claimed is:

1. A communication circuit comprising:
   a communication line comprising three or more signal lines; and
   a plurality of nodes, each of the nodes connected to an end of the communication line, and each of the nodes including:
      a signal distributing section, which is connected to a respective one of the ends of the communication line, for distributing and transmitting a signal input into an input/output terminal to the signal lines;
      a majority selection receiving circuit for comparing a plurality of reception signals received via the signal lines and selecting reception signals of the plurality of reception signals that are most matched with each other as true so as to output them to the input/output terminal; and
      a time division communication control section for switching communication directions of the signal distributing section and the majority selection receiving circuit at time-divided timing so as to hold bidirectional communication,
      wherein the time division communication control section includes a token call control section for transmitting tokens according to a number of the plurality of nodes at predetermined times, and
      wherein, at synchronous timings given to the plurality of the nodes and following the tokens to the communication line, one of the plurality of nodes outputs the signal input into its input/output terminal and a remainder of the plurality of nodes provides interlocking to prevent their signals from being input from their input/output terminals.

2. The communication circuit according to claim 1, wherein, in each of the plurality of nodes, the signal distributing section receives parallel signals input into a plurality of input/output terminals, and converts the parallel signals into serial signals so as to transmit them to the signal lines, and the majority selection receiving circuit compares a plurality of serial signals received via the signal lines and selects serial signals of the plurality of serial signals that are most matched with each other as true and converts them into parallel signals so as to output them to the plurality of input/output terminals.

3. The communication circuit according to claim 2, wherein, in each of the plurality of nodes, the majority selection receiving circuit has a converting circuit, which is connected to the signal lines, for converting the plurality of serial signals into parallel signals, a comparing circuit for comparing the plurality of converted parallel signals in a unit of parallel signal group, and a selecting circuit for selecting the parallel signals of the plurality of converted parallel signals that are most matched with each other using the compared result of the comparing circuit.

4. The communication circuit according to claim 3, further comprising, in each of the plurality of nodes, an input/output circuit for outputting the parallel signals selectively received by the majority selection receiving circuit via the input/output terminals and interlocking the input/output terminals used for outputting the parallel signals so that no signal is input via the input/output terminals.

5. The communication circuit according to claim 4, wherein
   the communication line is branched and has at least three ends, and a node of the plurality of nodes is connected to each of the three ends of the communication line, and
   each of the plurality of nodes further includes:
      a storage circuit for storing other signals received from terminals of the signal lines; and
      an OR operating circuit for setting a logical sum of the other signals stored in the storage circuit as a reception signal.

6. The communication circuit according to claim 3, wherein
   the communication line is branched and has at least three ends, and a node of the plurality of nodes is connected to each of the three ends of the communication line, and
   each of the plurality of nodes further includes:
      a storage circuit for storing other signals received from terminals of the signal lines; and
      an OR operating circuit for setting a logical sum of the other signals stored in the storage circuit as a reception signal.

7. The communication circuit according to claim 2, further comprising, in each of the plurality of nodes, an input/output circuit for outputting the parallel signals selectively received by the majority selection receiving circuit via the input/output terminals and interlocking the input/output terminals used for outputting the parallel signals so that no signal is input via the input/output terminals.

8. The communication circuit according to claim 7, wherein
the communication line is branched and has at least three ends, and a node of the plurality of nodes is connected to each of the three ends of the communication line, and
each of the plurality of nodes further includes:
a storage circuit for storing other signals received from terminals of the signal lines; and
an OR operating circuit for setting a logical sum of the other signals stored in the storage circuit as a reception signal.

9. The communication circuit according to claim 2, wherein
the communication line is branched and has at least three ends, and a node of the plurality of nodes is connected to each of the three ends of the communication line, and
each of the plurality of nodes further includes:
a storage circuit for storing other signals received from terminals of the signal lines; and
an OR operating circuit for setting a logical sum of the other signals stored in the storage circuit as a reception signal.

10. The communication circuit according to claim 2, further comprising a section including:
a signal distributing section, which is connected to a respective one of the ends of the communication line, for distributing and transmitting signals input into a plurality of input/output terminals to the signal lines;
a majority selection receiving circuit for comparing a plurality of reception signals received via the signal lines and selecting reception signals of the plurality of reception signals that are most matched with each other as true so as to output them to the input/output terminals;
a plurality of internal signal output sections for outputting the signals received by the majority selection receiving circuit;
a plurality of internal signal input sections for inputting the signals transmitted to the signal lines via the signal distributing section; and
a grid-shaped wire connecting circuit for connecting the internal signal output sections and the internal signal input sections arbitrarily so as to switch a connecting state between the input/output terminals.

11. A connecting apparatus comprising:
relay input/output terminals connected to input/output terminals of at least two of the communication circuits according to claim 2;
internal signal output sections for outputting signals received from the relay input/output terminals;
internal signal input sections for inputting signals transmitted from the relay input/output terminals;
an input/output circuit for outputting parallel signals input into the internal signal input sections via the relay input/output terminals and interlocking to prevent input of another signal via the relay input/output terminals outputting the signals, and simultaneously outputting the signals input via the relay input/output terminals via the internal signal output sections; and
a grid-shaped wire connecting circuit for connecting the internal signal output sections and the internal signal input sections arbitrarily so as to switch a connecting state between the input/output terminals.

12. The communication circuit according to claim 1, wherein each of the plurality of nodes further includes an input/output circuit that includes a switching circuit for switching the communication directions controlled by the time division communication control section,
wherein the input/output circuit connects by switching the input/output terminal to the signal distribution section or the majority selection receiving circuit, so that, when the signals from the majority selection receiving circuit are output to the input/output terminal, the interlocking is provided by not allowing the signal from the input/output terminal to be input to the signal distributing section.

13. A communication circuit comprising:
a communication line comprising three or more signal lines; and
a plurality of nodes, each of the nodes connected to an end of the communication line, and each of the nodes including:
a signal distributing section, which is connected to a respective one of the ends of the communication line, for distributing and transmitting a signal input into an input/output terminal to the signal lines;
a majority selection receiving circuit for comparing a plurality of reception signals received via the signal lines and selecting reception signals of the plurality of reception signals that are most matched with each other as true so as to output them to the input/output terminal; and
a time division communication control section for switching communication directions of the signal distributing section and the majority selection receiving circuit at time-divided timing so as to hold bidirectional communication;
a storage circuit for storing other signals received from terminals of the signal lines; and
an OR operating circuit for setting a logical sum of the other signals stored in the storage circuit as a reception signal, wherein
the communication line is branched and has at least three ends, and a node of the plurality of nodes is connected to each of the three ends of the communication line.

14. A connecting apparatus comprising:
relay input/output terminals connected to input/output terminals of at least two of the communication circuits according to claim 13;
internal signal output sections for outputting signals received from the relay input/output terminals;
internal signal input sections for inputting signals transmitted from the relay input/output terminals;
an input/output circuit for outputting parallel signals input into the internal signal input sections via the relay input/output terminals and interlocking to prevent input of another signal via the relay input/output terminals outputting the signals, and simultaneously outputting the signals input via the relay input/output terminals via the internal signal output sections; and
a grid-shaped wire connecting circuit for connecting the internal signal output sections and the internal signal input sections arbitrarily so as to switch a connecting state between the input/output terminals.

15. The connecting apparatus according to claim 14, wherein
the grid-shaped wire connecting circuit comprises a programmable logic device, and
the connecting apparatus further comprises a writing port for writing wire connecting information into the programmable logic device so as to enable the connecting state by the grid-shaped wire connecting circuit to be adjustable.

16. A communication circuit comprising:
a communication line comprising three or more signal lines;
a plurality of nodes, each of the nodes connected to an end of the communication line, and each of the nodes including:
a signal distributing section, which is connected to a respective one of the ends of the communication line, for distributing and transmitting signals input into a plurality of input/output terminals to the signal lines;
a majority selection receiving circuit for comparing a plurality of reception signals received via the signal lines and selecting reception signals of the plurality of reception signals that are most matched with each other as true so as to output them to the input/output terminals; and
a time division communication control section for switching communication directions of the signal distributing section and the majority selection receiving circuit at time-divided timing so as to hold bidirectional communication; and
a section including:
a signal distributing section, which is connected to a respective one of the ends of the communication line, for distributing and transmitting signals input into a plurality of input/output terminals to the signal lines;
a majority selection receiving circuit for comparing a plurality of reception signals received via the signal lines and selecting reception signals of the plurality of reception signals that are most matched with each other as true so as to output them to the input/output terminals;
a plurality of internal signal output sections for outputting the signals received by the majority selection receiving circuit;
a plurality of internal signal input sections for inputting the signals transmitted to the signal lines via the signal distributing section; and
a grid-shaped wire connecting circuit for connecting the internal signal output sections and the internal signal input sections arbitrarily so as to switch a connecting state between the input/output terminals.

17. The communication circuit according to claim 16, wherein the section further comprises a relay connecting section, that is directly connected to the grid-shaped wire connecting circuit, for relaying the signal.

18. A communication network comprising a plurality of communication circuits, at least one of the plurality of communication circuits being the communication circuit according to claim 17, formed in a net-shaped pattern via the grid-shaped wire connecting circuit,
wherein, in the section,
the grid-shaped wire connecting circuit comprises a programmable logic device,
the plurality of internal signal output sections has a writing port for writing wire connecting information, and
the majority selection receiving circuit has a reliability monitoring circuit for counting at least one of how many times defective communication occurs and how many times proper reception cannot be carried out, so as to obtain reliability of the signal lines, and
wherein the section further includes a wire connection adjusting section for adjusting wire connecting states obtained by the grid-shaped wire connecting circuit so that a communication line with low reliability is bypassed on positions where the reliability monitoring circuit and a writing port of every communication circuit are communicable.

19. A communication network comprising a plurality of communication circuits, at least one of the plurality of communication circuits being the communication circuit according to claim 16, formed in a net-shaped pattern via the grid-shaped wire connecting circuit,
wherein, in the section,
the grid-shaped wire connecting circuit comprises a programmable logic device,
the plurality of internal signal output sections has a writing port for writing wire connecting information, and
the majority selection receiving circuit has a reliability monitoring circuit for counting at least one of how many times defective communication occurs and how many times proper reception cannot be carried out, so as to obtain reliability of the signal lines, and
wherein the section further includes a wire connection adjusting section for adjusting wire connecting states obtained by the grid-shaped wire connecting circuit so that a communication line with low reliability is bypassed on positions where the reliability monitoring circuit and a writing port of every communication circuit are communicable.

20. A connecting apparatus comprising:
relay input/output terminals connected to input/output terminals of at least two of the communication circuits according to claim 16;
internal signal output sections for outputting signals received from the relay input/output terminals;
internal signal input sections for inputting signals transmitted from the relay input/output terminals;
an input/output circuit for outputting parallel signals input into the internal signal input sections via the relay input/output terminals and interlocking to prevent input of another signal via the relay input/output terminals outputting the signals, and simultaneously outputting the signals input via the relay input/output terminals via the internal signal output sections; and
a grid-shaped wire connecting circuit for connecting the internal signal output sections and the internal signal input sections arbitrarily so as to switch a connecting state between the input/output terminals.

21. The connecting apparatus according to claim 20, wherein
the grid-shaped wire connecting circuit comprises a programmable logic device, and
the connecting apparatus further comprises a writing port for writing wire connecting information into the programmable logic device so as to enable the connecting state by the grid-shaped wire connecting circuit to be adjustable.

* * * * *